United States Patent Office 3,641,222
Patented Feb. 8, 1972

3,641,222
S,S-DIALKYL-AMIDO-DITHIOPHOSPHATES

Marion F. Botts, Independence, Mo., and Erik K. Regel, Oberkohlfurth, Germany, assignors to Chemagro Corporation, Kansas City, Mo.
No Drawing. Filed Mar. 28, 1969, Ser. No. 811,631
Int. Cl. A01n 9/36; C07f 9/22, 9/24
U.S. Cl. 260—959
10 Claims

ABSTRACT OF THE DISCLOSURE

S,S-dialkyl-amido-dithiophosphates, i.e., S,S-dialkyl-(N-unsubstituted amido, N-mono and N,N-di alkyl, phenyl and/or chlorophenyl-substituted amido, as well as N-heterocyclic) - dithiol-phosphates, which possess defoliant and/or desiccant properties coupled with insecticidal and acaricidal properties.

---

The present invention relates to and has for its objects the provision for particular new S,S-dialkyl-amido-dithiophosphate, i.e. S,S-dialkyl-(N-substituted amido, N-mono and N,N-di alkyl, phenyl and/or chlorophenyl-substituted amido, as well as N-heterocyclic)-dithiol - phosphates, which possess valuable defoliant, desiccant, acaricidal and insecticidal properties, active compositions in the form of mixtures of such compounds with solid and liquid dispersible carrier vehicles, and methods of producing such compounds and for using such compounds in a new way, especially for defoliating and/or desiccating plants and combating insect and acarid pests, with other and further objects becoming apparent from a study of the within specification and accompanying examples.

It is known that S,S,S-trialkyl-trithiophosphates, such as the trithiophosphate of the formula

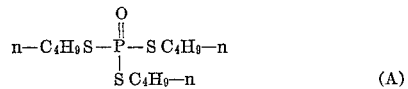

can be used as defoliant active compounds (cf. U.S. Pat. 2,943,107 and U.S. Pat. 2,965,467). Such compounds, however, are not disclosed as having any insecticidal properties.

It is also known that O,O-dialkyl-amido-phosphates, such as the O,O-dialkyl-amido-phosphate of the formula

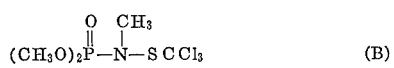

can be used as pesticides (cf. German Pat. 1,022,587; C.A. 54, page 4389h). Such compounds, however, are not disclosed as having any desiccant or defoliant properties.

It has now been found, in accordance with the present invention, that the particular new S,S-dialkyl-amido-dithiophosphates of the general formula

in which

R is alkyl of 1–4 carbon atoms, and
R′ and R″, each individually, is hydrogen, alkyl of 1–4 carbon atoms, phenyl, or chloro-substituted phenyl, or R′ and R″ when taken together with the adjacent nitrogen atom form a morpholino group, exhibit strong defoliant, desiccant and insecticidal properties.

It has been furthermore found, in accordance with the present invention, that the compounds of Formula I above may be produced by a process which comprises reacting an S,S-dialkyl-chlorido-dithiophosphate of the formula

in which R is the same as defined above, with an amine of the formula

in which R′ and R″ are the same as defined above, optionally in the presence of a solvent.

S,S-dialkyl-amido-dithiophosphate of the instant type should also be possible to prepare according to the following scheme:

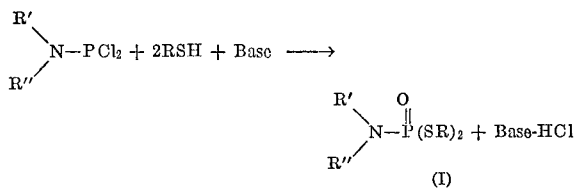

in which R, R′ and R″ are the same as defined above, and the "Base" is for example triethylamine, pyridine, dimethyl aniline, etc.

This last method is not reported in the literature for the preparation of S,S-dialkyl-amido-dithiophosphate but the analogous O,O-dialkyl-amido-phosphates are reported by this method (cf. G. M. Kosolapoff, "Organo-phosphorus Compounds," John Wiley & Sons [1950], p. 287).

Surprisingly, the S,S-dialkyl-amido-dithiophosphates of the instant invention show a higher defoliant-desiccant activity than the S,S,S-trialkyl trithiophosphates known from the prior art which are chemically the closest active compounds of the same type of activity. Furthermore, this defoliant-desiccant activity is coupled advantageously with strong insecticidal activity, especially contact action, not exhibited by the known S,S,S-trialkyl trithiophosphates. In this regard, the known O,O-dialkyl-amido-phosphates are not even known to possess any defoliant-desiccant activity. The active compounds of the present invention therefore represent a valuable enrichment of the defoliant-desiccant art and a new group of insecticidally and acaricidally potent compounds.

If for instance methyl amine (IIIa) and S,S-di-n-propyl chlorido-dithiophosphate (IIa) are used as starting materials, the course of the reaction can be represented by the following reaction scheme:

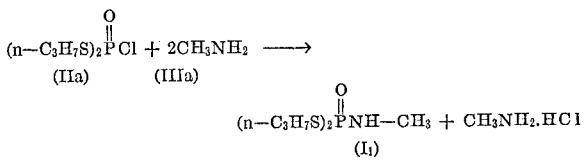

Advantageously, in accordance with the present invention, in the various formulae herein:

R represents
    lower alkyl of 1–4 carbon atoms, including straight and branched chains, such as methyl, ethyl, n- and isopropyl, n-, iso-, sec.- and tert.-butyl, and the like; and R′ and R″ each individually represents
    hydrogen;
    lower alkyl of 1–4 carbon atoms including straight and branched chains, such as methyl to tert.-butyl inclusive, as defined above, especially $C_{1-3}$ alkyl, and more especially methyl and isopropyl; R' and R" being the same or different when both are $C_{1-4}$ alkyl;

phenyl; or chloro-substituted phenyl such as 1–3 chlorosubstituted phenyl, especially mono and di chlorophenyl and more especially 2-, 3- and 4-chlorophenyl and 2,3-, 2,4-, 2,5-, 2,6-, 3,4- and 3,5-dichlorophenyl;

with the proviso that R' and R" when taken together with the adjacent nitrogen atom form a morpholino group.

Preferably, R is $C_{1-4}$ alkyl; R' is hydrogen, $C_{1-4}$ or $C_{1-3}$ alkyl, phenyl or dichlorophenyl; R" is hydrogen or $C_{1-4}$ or $C_{1-3}$ alkyl; and R' and R" when taken together with the adjacent nitrogen atom form a morpholino group.

Furthermore, while R is $C_{1-4}$ alkyl; preferably R' and R" are hydrogen; or preferably R' is $C_{1-4}$ alkyl and R" is hydrogen; or preferably R' and R" are $C_{1-4}$ alkyl; or preferably R' is phenyl and R" is hydrogen; or preferably R' is dichlorophenyl and R" is hydrogen; or preferably R' and R" together with the adjacent nitrogen atom form a morpholino group.

In particular, R is n-propyl, methyl, n-butyl, isopropyl or ethyl, R' is methyl, isopropyl, n-propyl, ethyl or n-butyl and R" is hydrogen.

Preferred compounds include:

($1_2$) S,S-di-n-propyl-(N-methyl amido)-dithiophosphate;
($2_1$) S,S-di-n-propyl-(N - isopropyl amido) - dithiophos-
($3_1$) S,S-dimethyl-(N-isopropyl amido)-dithiophosphate; and
($4_1$) S,S-di-n-butyl-(N-methyl amido)-dithiophosphate.

The types of starting amines usable in accordance with the process of the present invention are clearly characterized by the Formula III stated above.

These starting compounds are well known and can be prepared readily on an industrial scale.

As examples of such starting amines which can be used according to the present invention, there may be mentioned in particular: ammonia, methylamine, ethylamine, n-propylamine, isopropylamine, n-butylamine, sec.-butylamine, isobutylamine, tert.-butylamine, dimethylamine, diethylamine, di-n-propylamine, diisopropylamine, di-n-butylamine, aniline, p-chloroaniline, 3,4-dichloroaniline, 3,5-dichloroaniline, morpholine, and the like.

The types of starting S,S-dialkyl-chloridothiophosphates usable in accordance with the process of the present invention are clearly characterized by the Formula II stated above.

These starting compounds are also well known and can be prepared readily [see Mastin et al., J.A.C.S. 67, 1662 (1945)].

As examples of such starting S,S-dialkylchlorido-dithiophosphates which can be used according to the present invention, there may be mentioned in particular:

S,S-dimethyl-chlorido-dithiophosphate,
S,S-diethyl-chlorido-dithiophosphate,
S,S-di-n-propyl-chlorido-dithiophosphate,
S,S-di-isopropyl-chlorido-dithiophosphate,
S,S-di-n-butyl-chlorido-dithiophosphate,
S,S-di-sec.-butyl-chlorido-dithiophosphate,
S,S-di-isobutyl-chlorido-dithiophosphate, and
S,S-di-tert.-butyl-chlorido-dithiophosphate.

The production reaction is carried out preferably in the presence of a solvent (this term also includes a mere diluent). Preferred solvents are those which do not react with, or react only slightly with, S,S-dialkyl-chlorido-dithiophosphates or amines, i.e. inert organic solvents. Examples of such solvents include hydrocarbons, such as hexane, benzene, toluene; ethers, such as tetrahydrofuran, dibutyl ether, dioxane; esters, such as ethyl acetate; and the like; and any desired mixtures of these solvents.

The reaction temperature used can be varied within a fairly wide range. In general, the reaction is carried out at substantially between about 20–150° C., and preferably between about 30–60° C.

In general, the starting reactants are used in proportions of approximately two molar equivalents of the amine to one molar equivalent of the S,S-dialkyl-chlorido-dithiophosphate. For those starting amines which are sluggish in reacting because of low basicities, one molar equivalent of triethylamine (or similar tertiary amine, e.g. pyridine, and the like) can be substituted advantageously as acid-binding agent, i.e. for the excess molar equivalent of the starting amine. The reaction can for example be carried out in such a manner that the starting amine is added dropwise to a solution of the S,S-dialkyl-chlorido-dithiophosphate at 30–60° C., and the reaction mixture is stirred at this temperature until all such amine has been consumed as determined by the pH of the solution. Of course, the reverse order may also be used, i.e. with the addition of the S,S-dialkyl-chlorido-dithiophosphate to the amine.

After completion of the reaction, the reaction mixture is worked up in the usual manner, i.e. by extracting with water until the aqueous extracts are neutral, drying the organic phase with a suitable drying agent such as anhydrous sodium sulfate, and removing the solvent in vacuo at 50–60° C. or by direct distillation. The resulting crude products can be further purified by vacuum distillation or recrystallization from a suitable solvent such as n-hexane, if desired.

Advantageously, the active compounds according to the present invention exhibit strong defoliant-desiccant properties as well as strong insecticidal and acaricidal properties, with low toxicity to warm-blooded creatures.

As to the defoliant-desiccant properties, the instant compounds can therefore be used for defoliation or for desiccation of the green parts of plants, i.e. as defoliating agents for all plants which in the normal course of nature shed their leaves seasonally as when they mature. Thus, the plants intended herein are those to which reference has just been made. Such plants are naturally deciduous and include, by way of example, cotton, bean, plants of the family Geraniaceae, shade trees, and the like.

As to the insecticidal and acaricidal properties, the insecticidal and acaricidal action sets in rapidly and is long-lasting. The instant compounds can, therefore, be used with very favorable results for the control of noxious sucking and biting insects, Diptera, as well as mites.

To the sucking insects contemplated herein there belong, in the main, aphids (Aphidae), such as the peach aphid (*Myzus persicae*), the bean aphid (*Doralis fabae*); scales, such as *Aspidiotus hederae, Lecanium hesperidum, Pseudococcus maritimus;* Thysanoptera, such as *Hercinothrips femoralis;* and bugs, such as the beet bug (*Piesma quadrata*) and the bed bug (*Cimex lectularius*); and the like.

With the biting insects contemplated herein there are classes, in the main, butterfly caterpillars, such as *Plutella maculipennis, Lymantria dispar;* beetles, such as the confused flour beetle (*Tribolium confusum*), granary weevils (*Siltophilus granarius*), the Colorado beetle (*Lepitinotarsa decemlineata*), and also species living in the soil, such as wireworms (*Agriotes* sp.), and larvae of the Cockchafer (*Melolontha melolontha*); cockroaches, such as the German cockroach (*Blatella germanica*); Orthoptera, such as the cricket (*Gryllus domesticus*); termites, such as Reticulitermes; Hymenoptera, such as ants, and the like.

The Diptera contemplated herein comprise in particular flies, such as the vinegar fly (*Drosophila melanogaster*), the Mediterranean fruit fly (*Ceratitis capitata*), the housefly (*Musca domestica*) and gnats, such as the mosquito (*Aedes aegypti*); and the like.

Particular important are the spider mites (Tetranychidae), such as the two-spotted spider mite (*Tetrany-*

*chus urticae*), the Euporean red mite (*Panonychus ulmi*); blister mites, such as the current blister mite (*Eriophyes ribis*) and Tarsonemids, such as *Tarsonemus pallidus*; and ticks.

The active compounds according to the instant invention can be utilized, if desired, in the form of the usual formulations or compositions with conventional inert pesticidal diluents, or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other defoliants, desiccants or insecticides, or fungicides, bactericides, etc., if desired, or in the form of particular dosage preparations for specific application made therefrom such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–9%, by weight of the mixture, whereas carrier composition mixtures suitable for direct application or field application generally contemplate those in which the active compound is present in an amount substantially between about 0.2–20% (especially for defoliant and/or desiccant purposes), or 0.001–20% (especially for insecticidal and acaricidal purposes), by weight of the mixture. Thus, the present invention contemplates overall compositions which comprise mixtures of a conventional dispersible carrier vehicle such as (1) a dispersible inert finely divided carrier solid and/or (2) a dispersible carrier liquid such as an inert organic solvent and/or water preferably including a surface-active effective amount of a carrier vehicle assistant, e.g. surface-active agent, such as an emulsifying agent and/or a dispersing agent, and an amount of the active compound which is effective for the purpose in question and which is generally between about 0.001–95%, or 0.2–95%, by weight of the mixture.

Generally, irrespective of any carrier vehicle which may be present, the active compounds may be applied in an amount substantially between about 0.1–10 lbs. per acre, for defoliant, desiccant, and/or insecticidal and acaricidal purposes.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight, of the active compound, or even the 100% active substance alone, e.g. about 20–100% by weight of the active compound.

Furthermore, the present invention contemplates methods of defoliating and/or desiccating plants, e.g. cotton, bean, plants of the family Geraniaceae, shade trees and the like, which comprise applying to at least one of such plants a correspondingly pesticidally toxic amount, i.e. a defoliating and/or desiccating effective amount, of the particular active compound of the invention alone or together with a carrier vehicle as noted above, i.e. to cause defoliation and/or desiccation of the plant.

The present invention also contemplates methods of selectively killing, combating or controlling pests, i.e. arthropods, which comprise applying to at least one of (a) such arthropods, and (b) their habitat, i.e. the locus to be protected, a correspondingly pesticidally toxic or combative amount, i.e. an arthropodicidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application and may be varied within a fairly wide range, depending upon the weather conditions, the purpose for which the active compound is used, and the type locus to be treated. Therefore, in special cases it is possible to go above or below the aforementioned concentration ranges and/or amount per unit area of the active compound.

The outstanding desiccant, defoliant, acaricidal and insecticidal activity of the particular active compounds of the present invention is illustrated, without limitation, by the following examples.

EXAMPLE 1

Defoliant-desiccant test
  Solvent: 25 milliliters acetone

To produce a suitable preparation of the particular active compound, 0.5 gram of such active compound is mixed with the stated amount of solvent and the resulting solution is then further diluted with such solvent to provide the below indicated rates of application of active compound in pounds per acre.

Cotton plants in the flowering stage are sprayed with the given active compound preparation until just dew moist. For each test 25 mls. of the appropriate active compound dilution are sprayed on two plants in an area of five square feet. The number of leaves on the plants is recorded.

After 7 days, the degree of desiccation is determined and expressed as a percentage, wherein 0% means that there is no desiccation and 100% means that there is complete desiccation.

After 7 days, the degree of defoliation is also determined and expressed as the percentage of the leaves which defoliated, i.e. which fall from the particular plant, wherein 0% means that there is no defoliation and 100% means that there is complete defoliation.

The particular active compounds tested, their rates of application, and the results obtained can be seen from the following Table 1:

TABLE 1.—DEFOLIANT-DESICCANT TEST

| Lbs. of active compound applied per acre... | Percent defoliation | | | Percent desiccation | | |
|---|---|---|---|---|---|---|
| | 4 | 2 | 1 | 4 | 2 | 1 |
| Active compound: | | | | | | |
| (A) $(n\text{-}C_4H_9S)_2\overset{O}{\overset{\|}{P}}SC_4H_9\text{-}n$ (known) | 68 | 51 | 44 | 60 | 70 | 30 |
| $(1_3)$ $(n\text{-}C_3H_7S)_2\overset{O}{\overset{\|}{P}}NHCH_3$ | 74 | 59 | 60 | 70 | 70 | 50 |
| $(2_2)$ $(n\text{-}C_3H_7S)_2\overset{O}{\overset{\|}{P}}NH\text{—}CH(CH_3)_2$ | 43 | 52 | 48 | 90 | 90 | 80 |
| $(4_2)$ $(n\text{-}C_4H_9S)_2\overset{O}{\overset{\|}{P}}NH\text{—}CH_3$ | 81 | 0 | 0 | 50 | 30 | 40 |

EXAMPLE 2

Insecticidal action

Confused flour beetle test [contact action] (*Tribolium confusum*)

Solvent: 10 milliliters acetone

To produce a suitable preparation of the particular active compound, 100 mg. of such active compound are mixed with the stated amount of the stated volatile solvent, and the resulting concentrate is diluted with further solvent to the desired final concentration.

One ml. of the resulting active compound preparation is placed in a dish and an additional 4 ml. of said solvent are added. The solvent is allowed to evaporate leaving a uniform dry film residue. Ten confused flour beetles (*Tribolium confusum*) are then placed into the dish and covered with a muslin screen.

After each of the periods of time stated in the following table, the degree of destruction is determined and expressed as a percentage: 100% means that all, and 0% means that none, of the test creatures are killed.

The particular active compounds tested, the amounts used and the results obtained can be seen from the following Table 2:

TABLE 2.—CONFUSED FLOUR BEETLE TEST [CONTACT ACTION]

| Active compound | Amount of active compound applied in mmg./dish | Mortality in percent after exposure of flour beetle for— | |
|---|---|---|---|
| | | 2 hrs. | 18 hrs. |
| $(1_4)$ $(CH_3CH_2CH_2S)_2\overset{O}{\overset{\|}{P}}NH\text{—}CH_3$ | 1,000 | 100 | 100 |
| $(2_3)$ $(CH_3CH_2CH_2S)_2\overset{O}{\overset{\|}{P}}NH\text{—}CH(CH_3)_2$ | 1,000 | 100 | 100 |
| $(3_2)$ $(CH_3S)_2\overset{O}{\overset{\|}{P}}NH\text{—}CH(CH_3)_2$ | 1,000 | 20 | 100 |

NOTE.—1 mmg.=0.000001 g.

EXAMPLE 3

Insecticidal action

Housefly test [contact action] (*Musca domestica*)

Solvent: 10 milliliters acetone

To produce a suitable preparation of the particular active compound, 100 mg. of such active compound are mixed with the stated amount of the stated volatile solvent, and the resulting concentrate is diluted with further solvent to the desired final concentration.

One ml. of the resulting active compound preparation is placed into an 8-ounce wide-mouth jar and an additional 4 ml. of said solvent are added. The solvent is allowed to evaporate leaving a uniform dry film residue. Ten to twenty flies (*Musca domestica*) are then placed in the jar and covered with a screen top. A cotton pad soaked in a 10% sugar-water solution is placed on top of the screen as food supply.

After each of the periods of time stated in the following table, the degree of destruction is determined and expressed as a percentage: 100% means that all, and 0% means that none, of the test creatures are killed.

The particular active compounds tested, the amounts used and the results obtained can be seen from the following Table 3:

TABLE 3.—HOUSEFLY TEST [CONTACT ACTION]

| Active compound | Amount of active compound applied in mmg./dish | Mortality in percent after exposure of housefly for— | |
|---|---|---|---|
| | | 2 hrs. | 18 hrs. |
| $(1_5)$ $(CH_3CH_2CH_2S)_2\overset{O}{\overset{\|}{P}}NH\text{—}CH_3$ | 1,000 | 100 | 100 |
| | 100 | 96 | 100 |
| | 10 | 0 | 96 |
| $(2_4)$ $(CH_3CH_2CH_2S)_2\overset{O}{\overset{\|}{P}}NH\text{—}CH(CH_3)_2$ | 1,000 | 83 | 100 |
| | 100 | 3 | 96 |
| | 10 | 0 | 10 |
| $(3_3)$ $(CH_3S)_2\overset{O}{\overset{\|}{P}}NH\text{—}CH(CH_3)_2$ | 1,000 | 96 | 100 |
| | 100 | 20 | 83 |
| | 10 | 0 | 3 |

NOTE.—1 mmg.=0.000001 g.

EXAMPLE 4

Acaricidal action

Two-spotted spider mite test [contact action] (*Tetranychus urticae*)

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (mol. wt. about 1000) ("Pluronic L–61")

To produce a suitable preparation of the particular active compound, 1 part by weight of such active compound is mixed intimately with 1 part by weight of the stated wettable powder base, and the resulting mixture is diluted with water to the desired final concentration.

The active compound preparation is sprayed to dew moist onto a 4th leaf stage cotton plant which has been infested for 24 hours with at least 25 two-spotted spider mites. After three days mortality observations are made and mortality (or kill) is expressed as the percentage of dead mites compared to the total number of mites on the cotton plant corrected for natural mortality.

100% means that all, and 0% means that none, of the mites have been immobilized.

The particular active compounds tested, their concentrations and the results obtained can be seen from the following Table 4:

TABLE 4.—TWO-SPOTTED SPIDER MITE TEST [CONTACT ACTION]

| Active compound | Active compound concentration in p.p.m. | Mortality after 3 days in percent |
|---|---|---|
| (1₆) $(CH_3CH_2CH_2S)_2\overset{O}{\overset{\|}{P}}-NH-CH_3$ | 1,000<br>100<br>10 | 100<br>100<br>88 |
| (3₄) $(CH_3S)_2\overset{O}{\overset{\|}{P}}-NH-CH(CH)_2$ | 1,000<br>100<br>10 | 96<br>78<br>58 |

The following further examples are set forth to illustrate, without limitation, the process for producing the active compounds according to the present invention.

EXAMPLE 5

$$(CH_3CH_2CH_2CH_2S)_2\overset{O}{\overset{\|}{P}}NH-CH_3 \quad (4_3)$$

26 g. of S,S-di-n-butyl-chlorido-dithiophosphate (0.1 mol) are diluted with 200 ml. of benzene. 6.8 g. of monomethylamine dissolved in 50 ml. of benzene are added dropwise with stirring over a twenty-minute period while maintaining the solution temperature at 25–30° C. Monomethylamine hydrochloride precipitates immediately during the addition. The reaction mixture is stirred at ambient temperature (25° C.) for an additional 4 hours to complete the reaction. The reaction mixture is then extracted with 3 separate 100 ml. portions of water and the benzene layer dried over anhydrous sodium sulfate. Solvent is then removed by in vacuo distillation to give 24 g. of colorless oil. The oil was purified further to give 22 g. (86.4% yield) of the pure compound, i.e. S,S,-di-n-butyl-(N-methyl amido)-dithiophosphate.

B.P. 130° C./0.03 mm.; $n_D^{21}$ 1.5210.

The following compounds are prepared in analogous manner:

| | $n_D^t$ | B.P., °C./mm. Hg | M.P., °C. |
|---|---|---|---|
| (5₁) $(C_2H_5S)_2\overset{O}{\overset{\|}{P}}NH_2$ | (¹) | 125/0.03 | 75 |
| (6₁) $(CH_3CH_2CH_2S)_2\overset{O}{\overset{\|}{P}}NH_2$ | (²) | (³) | |
| (7₁) $(CH_3CH_2CH_2CH_2S)_2\overset{O}{\overset{\|}{P}}NH_2$ | 1.5306²⁵ | (³) | |
| (8₁) $(C_2H_5S)_2\overset{O}{\overset{\|}{P}}NH-CH_3$ | 1.5468²¹ | 102/0.03 | |
| (1₇) $(CH_3CH_2CH_2S)_2\overset{O}{\overset{\|}{P}}NH-CH_3$ | 1.5314²¹ | 115/0.04 | |
| (9₁) $(C_2H_5S)_2\overset{O}{\overset{\|}{P}}N\overset{CH_3}{\diagdown}_{CH_3}$ | 1.5305²⁰ | 87/0.05 | |
| (10₁) $(CH_3CH_2CH_2S)_2\overset{O}{\overset{\|}{P}}N\overset{CH_3}{\diagdown}_{CH_3}$ | 1.5202²⁰ | 102/0.05 | |
| (11₁) $(CH_3CH_2CH_2CH_2S)_2\overset{O}{\overset{\|}{P}}N\overset{CH_3}{\diagdown}_{CH_3}$ | 1.5120²⁰ | 118/0.1 | |
| (3₅) $(CH_3S)_2\overset{O}{\overset{\|}{P}}NH-CH(CH_3)_2$ | 1.5460²⁵ | 110/0.03 | |
| (12₁) $C_2H_5S)_2\overset{O}{\overset{\|}{P}}NH-CH(CH_3)_2$ | 1.5380²⁵ | 122/0.02 | |
| (13₁) $(CH_3S)_2\overset{O}{\overset{\|}{P}}NH-\hspace{-2pt}\langle\hspace{-4pt}\bigcirc\hspace{-4pt}\rangle$ | (¹) | | 101 |
| (14₁) $(CH_3S)_2\overset{O}{\overset{\|}{P}}-N\hspace{-4pt}\bigcirc\hspace{-4pt}O$ | 1.5609²⁵ | 125/0.03 | |
| (15₁) $(CH_3S)_2\overset{O}{\overset{\|}{C}}-NH-\hspace{-2pt}\langle\hspace{-4pt}\bigcirc\hspace{-4pt}\rangle\hspace{-4pt}\begin{array}{c}Cl\\Cl\end{array}$ | (¹) | | 184 |
| (2₅) $(CH_3CH_2CH_2S)_2\overset{O}{\overset{\|}{P}}NH-CH(CH_3)_2$ | 1.5290²⁵ | 130/0.02 | |

¹ Crystalline.
² Semi-crystalline.
³ Decomp.

EXAMPLE 6

Using corresponding molar amounts of the appropriate starting amines and chlorido-dithiolphosphates, respectively, in accordance with the general procedure of Example 4, as the case may be, the following compounds are also prepared:

(16₁) S,S-di-isopropyl-(N-isopropylamido)-dithiophosphate
(17₁) S,S-di-ethyl-(N-n-propylamido)-dithiophosphate
(18₁) S,S-dimethyl-(N-ethylamido)-dithiophosphate
(19₁) S,S-di-n-butyl-(N-n-butylamido)-dithiophosphate It will be realized by the artisan that all of the foregoing compounds contemplated by the present invention possess the desired strong defoliant-desiccant and/or insecticidal properties, with regard to a broad spectrum of activity, as well as a comparatively low toxicity to warm-blooded creatures, enabling such compounds to be used with correspondingly favorable compatibility with warm-blooded creatures for more effective defoliant-desiccant and/or insecticidal purposes.

As may be used herein, the terms "arthropod," "arthopodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. S,S-dialkyl-amido-dithiophosphate of the formula

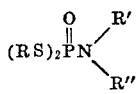

in which R is alkyl of 1–4 carbon atoms, and R' and R" each individually is selected from the group consisting of hydrogen, alkyl of 1–4 carbon atoms, phenyl and chloro-substituted phenyl.

2. Compound according to claim 1 wherein R is $C_{1-4}$ straight chain alkyl, R' is selected from the group consisting of hydrogen, $C_{1-4}$ alkyl, phenyl and dichlorophenyl, and R" is selected from the group consisting of hydrogen and $C_{1-4}$ alkyl.

3. Compound according to claim 1 wherein R is $C_{1-4}$ alkyl, and R' and R" are both hydrogen.

4. Compound according to claim 1 wherein R is $C_{1-4}$ alkyl, R' is $C_{1-4}$, and R" is hydrogen.

5. Compound according to claim 1 wherein R is $C_{1-4}$ alkyl, R' is $C_{1-4}$ alkyl, and R" is $C_{1-4}$ alkyl.

6. Compound according to claim 1 wherein R is $C_{1-4}$ alkyl, R' is selected from the group consisting of phenyl and dichlorophenyl and R" is hydrogen.

7. Compound according to claim 1 wherein such compound is S,S-di-n-propyl-(N-methyl amido)-dithiophosphate of the formula

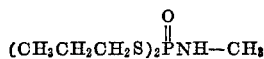

8. Compound according to claim 1 wherein such compound is S,S-di-n-propyl-(N-isopropyl amido)-dithiophosphate of the formula

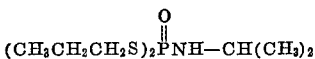

9. Compound according to claim 1 wherein such compound is S,S-dimethyl-(N-isopropyl amido)-dithiophosphate of the formula

10. Compound according to claim 1 wherein such compound is S,S-di-n-butyl-(N-methyl amido)-dithiophosphate of the formula

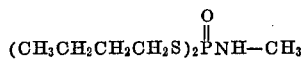

References Cited

UNITED STATES PATENTS

| | | | |
|---|---|---|---|
| 3,019,250 | 1/1962 | Kayser et al. | 260—959 X |
| 3,309,266 | 3/1967 | Magee | 260—959 X |
| 3,309,317 | 3/1967 | Wittner et al. | 260—959 X |
| 3,502,614 | 3/1970 | Wood | 260—959 X |

CHARLES B. PARKER, Primary Examiner

R. L. RAYMOND, Assistant Examiner

U.S. Cl. X.R.

260—247.1, 984; 424—200, 220

PO-1050
(5/69)

UNITED STATES PATENT OFFICE
CERTIFICATE OF CORRECTION

Patent No. 3,641,222        Dated February 8, 1972

Inventor(s) Marion F. Botts, et al.

It is certified that error appears in the above-identified patent and that said Letters Patent are hereby corrected as shown below:

Col. 2, line 19

"$PCl_2$" should be -- $\overset{O}{\underset{\|}{P}}Cl_2$ --

Col. 3, line 29

"dithiophos-" should be --dithiophosphate--

Col. 7, Table I

Last figures in last two columns should be transposed - "30  40" should be -- 40  30--

Signed and sealed this 20th day of June 1972.

(SEAL)
Attest:

EDWARD M. FLETCHER, JR.      ROBERT GOTTSCHALK
Attesting Officer            Commissioner of Patents